United States Patent [19]

Meyn

[11] Patent Number: 4,965,908
[45] Date of Patent: Oct. 30, 1990

[54] METHOD AND APPARATUS FOR SEPARATING THE HEART AND THE LUNGS OF A HEART-LUNGS PACKAGE OF POULTRY

[75] Inventor: Cornelis Meyn, Oostzaan, Netherlands

[73] Assignee: Meyn Machinefabriek B.V., Oostzaan, Netherlands

[21] Appl. No.: 409,253

[22] Filed: Sep. 19, 1989

[30] Foreign Application Priority Data

Nov. 15, 1988 [NL] Netherlands .......................... 8802815

[51] Int. Cl.$^5$ .............................................. A22C 21/00
[52] U.S. Cl. .......................................... 17/11; 17/45; 17/51
[58] Field of Search ................................ 17/11, 45, 51

[56] References Cited

U.S. PATENT DOCUMENTS

| | | | |
|---|---|---|---|
| 3,760,457 | 9/1973 | Dillon ................................. | 17/11 A |
| 4,004,320 | 1/1977 | Scheier et al. ........................... | 17/11 |
| 4,019,222 | 4/1977 | Scheier et al. ........................... | 17/11 |
| 4,262,387 | 4/1981 | Scheier et al. ........................... | 17/45 |
| 4,467,498 | 8/1984 | Graham et al. ........................... | 17/11 |

FOREIGN PATENT DOCUMENTS 8502785  5/1986  Netherlands ............................ 17/11

*Primary Examiner*—Willis Little
*Attorney, Agent, or Firm*—Dority & Manning

[57] ABSTRACT

A method for separating the heart and the lungs of a heart-lungs package of poultry makes use of the difference in specific weight of the heart and the lungs. When the separated heart and lungs are introduced into a water basin, the lungs will float whereas the hearts will sink. Separately discharging the heart and lungs then is easy for accomplish.

The apparatus for separating the heart and the lungs comprises two cooperating parallel rolls for removing the muscle tissue from the package and a water basin for separating the heart and lungs due to their different specific weights. Separate discharge means are provided for the heart and lungs.

15 Claims, 2 Drawing Sheets

METHOD AND APPARATUS FOR SEPARATING THE HEART AND THE LUNGS OF A HEART-LUNGS PACKAGE OF POULTRY

BACKGROUND OF THE INVENTION

The invention relates to a method for separating the heart and the lungs of poultry.

The heart of poultry is suitable for human consumption, whereas the lungs are part of the waste used in animal feed. Therefore, it is important that the heart and the lungs of poultry are separated from each other. According to a known method, this separation is done manually, being labor intensive, thus expensive, and leading to a low productivity.

SUMMARY OF THE INVENTION

It is an object of the invention to provide a method for separating hearts and lungs of poultry not having these disadvantages.

Therefore, the method according to the invention is characterized in that firstly, the muscle tissue interconnecting the heart and the lungs is removed, whereafter the heart, and the lungs, loosened from it, are discharged via separate ways.

The method according to the invention can, in an effective way, be carried out automatically, thus increasing the productivity and lowering the costs.

A preferred embodiment of the method according to the invention discharges the heart and lungs via separate ways in a water basin, based on their different specific weights, whereby the lungs float on the water and the heart sinks. The specific weight of the lungs is lower than the specific weight of water, so the lungs float. The heart, however, has a specific weight that is higher than the specific weight of water, so the heart will sink. In this way a separation between the lungs and the hearts will occur, which thereafter can be discharged separately.

The invention also relates to an apparatus for carrying out the method according to the invention. According to the invention, this apparatus is characterized by a means for removing the muscle tissue from the heart-lungs package and by a means for discharging the loosened heart and the loosened lungs via separate ways.

According to a preferred embodiment of the apparatus, according to the invention, the means for discharging the loosened heart and the loosened lungs via separate ways comprises a water basin joining the discharge end of the means for removing the muscle tissue. With the aid of the water basin, separation of the loosened lungs and heart can occur in the way described before.

Means are provided for discharging the lungs floating on the water and for discharging the sunk hearts. Moreover, the discharge means for the floating lungs comprise a blower positioned next to the water basin and directed towards a discharge. By means of this blower the lungs are blown towards the discharge and can be taken away through this discharge.

Moreover, the discharge means for the floating lungs comprises a conveyor screw extending upwards from the bottom of the water basin. At the discharge end of this conveyor screw, the hearts can then be collected.

Moreover, the apparatus, according to the invention, is designed so that the means for removing the muscle tissue comprises two parallel rolls lying closely together, the rolls rotate towards each other and have threads that propel the heart-lungs package to be processed in their longitudinal direction. With the help of these two rolls the muscle tissue is seized and drawn between the two rolls, and is thus removed from the heart-lungs package. Thereafter, the heart and the lungs remain loosened from each other on the rolls and are propelled towards the discharge end.

It is preferred that a dosage plate is provided that ends at a short distance above the feeding ends of these rolls. As a result, a large amount of heart-lungs packages can be supplied, all at once, at the feeding end of the rolls, whereby the dosage plate ensures that these packages are processed by the rolls one by one.

In such a case, it is further advantageous if, above the rolls, and ending at a short distance above the rolls, at least one obstruction means is provided for temporarily obstructing the heart-lungs package, the obstruction means having a lowermost end that is pivotable in the propelling direction of the rolls against a force, such as spring force. This obstruction means prevents the heart-lungs packages from being propelled by the rolls without the rolls seizing the muscle tissue.

BRIEF DESCRIPTION OF THE DRAWINGS

Hereafter the invention will be elucidated by means of the drawings in which an embodiment of the apparatus, according to the invention, is illustrated.

DETAILED DESCRIPTION OF THE INVENTION

Figure 1:
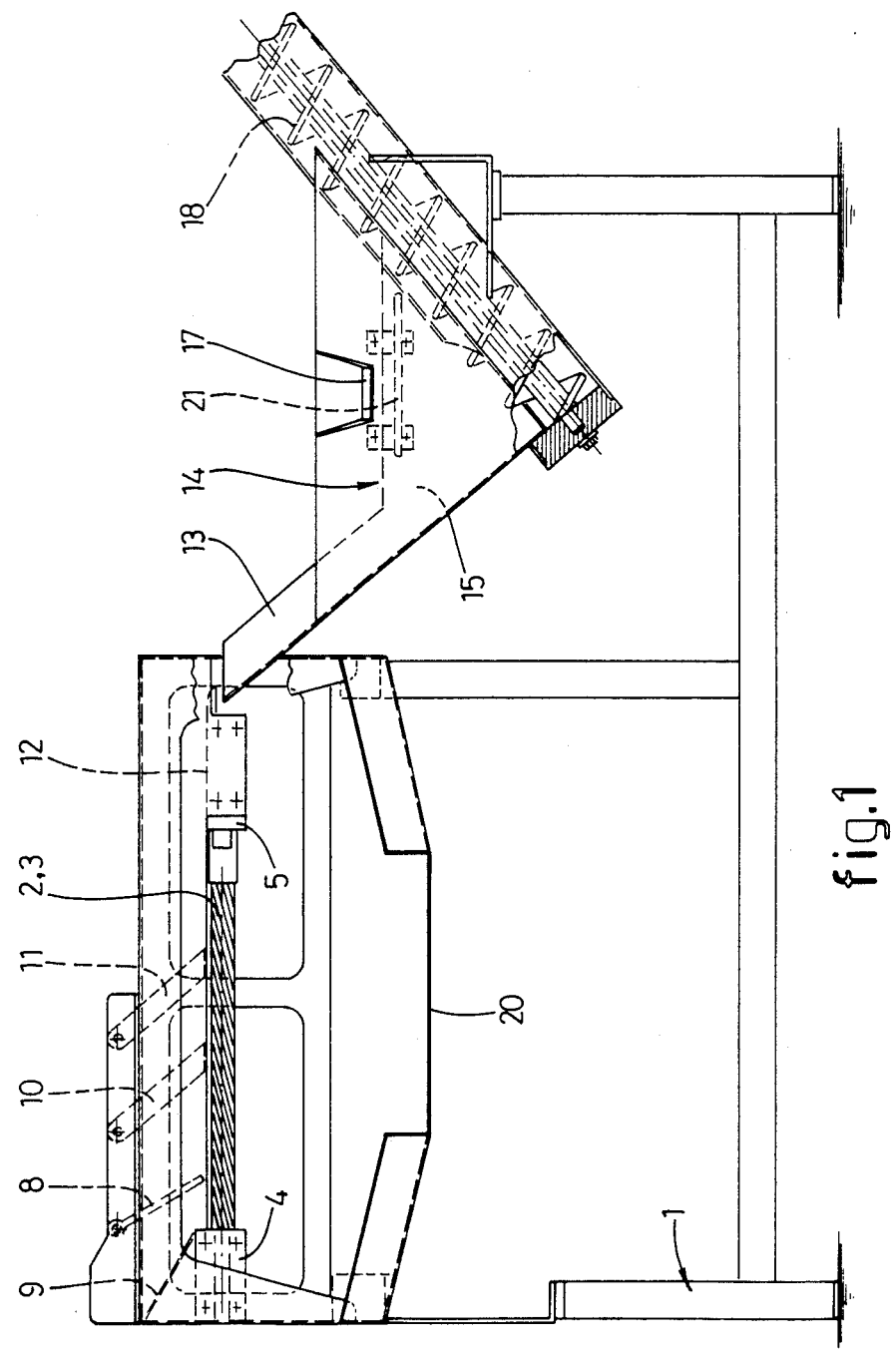
FIG. 1 shows, schematically in a side elevational view, an embodiment of the apparatus according to the invention.
Figure 2:
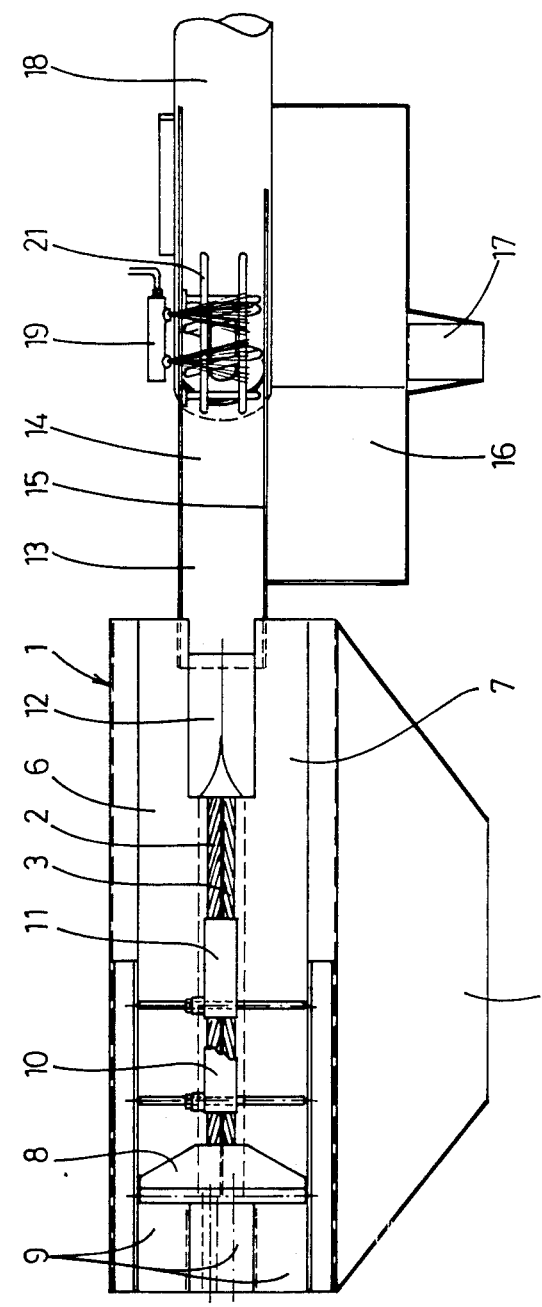
FIG. 2 shows the apparatus, according to FIG. 1, in a top plan view.

The apparatus shown in FIG. 1 and FIG. 2 has a frame 1 onto which the different parts of the apparatus are mounted. Among others, these are firstly two parallel rolls 2 and 3 lying closely together and that, in a way known per se, are mounted in the frame 1 by means of mounting blocks 4 and 5. The rolls 2 and 3 are each provided with helically extending threads, whereby the threads of both rolls extend in an opposite sense.

The rolls 2 and 3 are driven by a (not illustrated) driving means, so that they rotate towards each other as seen from their upper sides. As a result of this direction of rotation and the helically extending threads as represented in the drawings, the products lying on rolls 2 and 3 are propelled from the left side to the right side as seen in FIGS. 1 and 2.

From the upper plane of the rolls 2 and 3, guide plates 6 and 7 extend laterally and guarantee that the products to be processed are always located near to the rolls 2 and 3.

At the feeding end of the rolls 2 and 3, a dosage plate is provided ending at a short distance above rolls 2 and 3. Products fed onto rolls 2 and 3 via a supply guide 9 are restricted by means of this dosage plate 8, so that they are propelled one by one by the rolls 2 and 3.

The dosage plate 8 is pivotally mounted on the frame 1. Mounted onto the frame 1, too, are two obstruction means 10 and 11 ending at a short distance above rolls 2 and 3. These obstruction means 10 and 11 pivot around their uppermost ends in the propelling direction of rolls 2 and 3. This rotation occurs against an opposite force, such as a spring force or the gravitational force acting on the obstruction means 10 and 11. An abutment means, not shown, guarantees that obstruction means 10 and 11 do not contact the rolls 2 and 3 in their rest or lowermost position.

The function of the obstruction means 10 and 11 is to prevent that products present on the rolls 2 and 3 from being propelled by these rolls 2 and 3 without these rolls 2 and 3 effectively processing the products. By means of the obstruction means 10 and 11 care has been taken that the rolls 2 and 3 effectively seize the products to be processed.

A horizontal guide plate 12 joins the discharge end of the rolls 2 and 3 and receives the products. Discharge plate 12 then changes into a downward chute 13 ending in a water basin 14.

Beside this water basin 14, separated therefrom by a lower wall section 15, is a collection reservoir 16 with discharge 17.

A conveyor screw 18 extends on an inclined plane upwards from the bottom of the water basin 14 and leads to a discharge not discussed in detail.

Further beside the water basin 14 is a blower 19 positioned to provide an air stream along the surface of the water in the water basin 14, directed towards the wall portion 15. The upper edge of wall portion 15 then acts as an overflow. Further, the drawings show a protection grid 21 preventing a person from being caught in the conveyor screw 18.

The shown apparatus operates as follows:

Heart-lungs packages of poultry are supplied to the rolls 2 and 3 via the supply guide 9. The dosage plate 8 guarantees that these heart-lungs packages are taken along one by one by the rolls 2 and 3.

The heart and the lungs of such a heart-lungs package are interconnected by a muscle tissue.

As a result of the action of the obstruction means 10 and 11, this muscle tissue is contacted with the threads of the rolls 2 and 3, whereafter this muscle tissue is pulled away from the heart and the lungs and is discharged downwards through the rolls 2 and 3 towards a discharge plate 20. The loosened heart and the lungs rest on the rolls 2 and 3 and are conveyed thereby to the guide plate 12 which then presents the heart and the lungs to the chute 13.

Via the chute 13, the heart and the lungs reach the water basin 14, which is filled with water and of which the water level corresponds with the upper edge of the wall portion 15. The specific weight of the hearts is such that they immediately sink in the water basin 14 and are received by the conveyor screw 18 and are discharged thereby.

The lungs, however, have a lower specific weight and will float. An air stream discharged by the blower 19 blows the lungs over the upper edge of the wall portion 15 into the collection reservoir 16 from which the lungs can be collected through the discharge 17.

The invention is not limited to the embodiment described and can be varied widely within the scope of the invention.

I claim:

1. A method for separating the heart from the lungs of poultry where the heart and lungs are interconnected by muscle tissue in a heart and lung package, comprising the steps of:
   (a) conveying said heart and lung package along a first path;
   (b) separating said muscle tissue from said heart and lungs to loosen said heart from said lungs;
   (c) separating said heart from said lungs;
   (d) discharging said heart along a second path; and
   (e) discharging said lungs along a third path.

2. A method as set forth in claim 1, including the step of separating said heart and lungs in a basin at least partially filled with water, based upon the specific weights of said heart and said lungs wherein said heart sinks into said second path and said lungs float into said third path.

3. Apparats for separating the heart from the lungs of poultry where the heart and lungs are interconnected by muscle tissue in a heart and lung package, comprising:
   (a) a supply of heart and lung packages;
   (b) conveyor means for receiving said heart and lung packages and for conveying said packages along a predetermined path;
   (c) means associated with said conveyor means for separating said muscle tissue from said heart and lungs as they are conveyed along said predetermined path to thereby loosen said heart from said lungs;
   (d) means for separating said heart from said lungs; and
   (e) means to discharge said separated heart and lungs along different paths.

4. Apparatus as set forth in claim 3, wherein said separating means comprises a basin of water.

5. Apparatus as set forth in claim 4, wherein said lungs float on said water to means for discharging said lungs along a first path and said hearts sink into means for discharging said hearts in a second path.

6. Apparatus as set forth in claim 5, wherein blower means are provided for directing floating lungs towards means for discharging said lungs in said first path.

7. Apparatus as set forth in claim 5, wherein said sunk hearts sink into a conveyor screw for directing said hearts in said second path.

8. Apparatus as set forth in claim 3, wherein said conveyor means comprises a pair of parallel rolls with interlocking helical threads to convey said heart packages along said predetermined path and for separating said muscle tissue from said heart and lungs as they are conveyed by said conveyor means.

9. Apparatus as set forth in claim 5, including means for controlling said supply so that said heart and lung packages enter said conveyor means one at a time.

10. Apparatus as set forth in claim 8, wherein said parallel rolls rotate towards each other, and said interlocking threads have an opposite pitch.

11. Apparatus as set forth in claim 9, wherein said means for controlling said supply comprises a dosage plate disposed adjacent to the feeding end of said parallel rolls at a short distance from said rolls.

12. Apparatus as set forth in claim 8, wherein obstruction means is disposed above said parallel rolls for temporarily obstructing said heart and lung packages.

13. Apparatus as set forth in claim 12, wherein said obstruction means comprises at least one pivoted plate.

14. Apparatus as set forth in claim 13, wherein said pivoted plate is spring loaded towards the surface of said parallel rolls.

15. Apparatus as set forth in claim 13, wherein the pivot of said pivoted plate is located so that gravity urges one end of said pivoted plate towards the surface of said parallel rolls.

* * * * *